June 17, 1969  J. LEWIS ET AL  3,450,240

SYNCHROMESH GEARS

Filed May 15, 1967

United States Patent Office 3,450,240
Patented June 17, 1969

3,450,240
SYNCHROMESH GEARS
John Lewis and Brian Thomas Lissaman, Coventry, England, assignors to Humber Limited, Warwickshire, England, a British company
Filed May 15, 1967, Ser. No. 638,547
Int. Cl. F16d 11/00, 13/00
U.S. Cl. 192—53     3 Claims

ABSTRACT OF THE DISCLOSURE

A synchromesh gear mechanism in which movement of one dog clutch member to engage a companion dog clutch member is resisted by a ball which is caused to roll along a radially outwardly inclined ramp and engages a groove in one of the members when the two members are not in synchronism.

---

The inventon relates to synchromesh gear mechansms of the kind in which one rotatable member of a dog clutch is movable axially to engage its dog teeth with the dog teeth of a companion dog clutch member and in which to effect synchronisation of the dog clutch members before engagement of the teeth, an axial force derived from initial movement of the first said member is transmitted through a connection with limited force transmitting characteristics (i.e. the connection is capable of slip, or other breakdown when force in excess of the limit is applied) to the movable member of an axially engageable friction clutch between the two dog clutch members, to effect engagement of the friction clutch members such engagement in the event of a speed difference moving a baulking member into a baulking position preventing movement of the dog clutch member to the engaging position, which baulk member is moved to a free position after synchronisation has been reached, or substantially reached, by operation of the friction clutch, the first said dog clutch member then being given further axial movement to effect the engagement of the dog clutch, the further movement being permitted by breakdown as aforesaid of the connection to the friction clutch and being relative to the members of the friction clutch.

The invention provides a synchromesh gear mechanism of the kind described in which the movable dog clutch member is a sleeve surrounding and splined to a rotatable hub for axial sliding movement therein, the baulking member is a stop located within a recess in the hub inside the sleeve and held by a shifter plate from which it projects radially outwardly, which plate is in thrust transmitting relation with the movable clutch member and circumferentially movable thereby to move the stop in the circumferential direction from the free position, in which it is aligned with and may pass through a gap between the internal splines in the sleeve, to the baulking position, in which the stop member lies in the path of one of the splines, and is operable to transmit axial thrust from the sleeve to the shifter plate and thence to the friction clutch member, the limited force transmitting connection being between the sleeve and the shifter plate whereby when the stop is in the free position, the sleeve is axially movable, with breakdown of the connection, to engage the dog clutch members.

In one form of the mechanism, the stop, when in the baulking position, is located in a recess intermediate in the length of one of the spline teeth.

In a preferred embodiment the base of the recess in the hub forms a ramp in the circumferential direction down which the stop is moved, with a component of inward movement, between the baulking and free position. It is further preferred that the stop is a ball or roller which rolls down the ramp.

The limited force transmitting connection may comprise a spring ring in an internal circumferential groove in the sleeve which releasably engages in a notch in the shifter plate.

A specific example of a synchromesh gear mechanism according to the invention will now be described with reference to the accompanying drawings in which.

Figure 1:
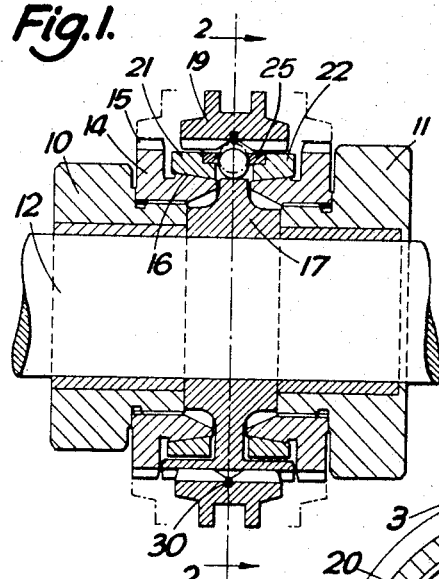
FIGURE 1 is a longitudinal section through the relevant parts.

The mechanism forming the subject of this example is arranged to couple either one of gears 10 and 11 to the shaft 12.

Secured to each gear there is a ring 14 which provides dog teeth 15 and a conical friction clutch surface 16. Splined to the shaft 12 there is a ring 17 which has splines or teeth 18 around its periphery. A sleeve 19 has internal dog teeth 20 engaging with the teeth 18 and is slidable axially to engage its teeth with either set of the teeth 15 thereby to form a dog clutch coupling gear 10 or 11 to the ring 17 and thence to the shaft 12.

Figure 4:
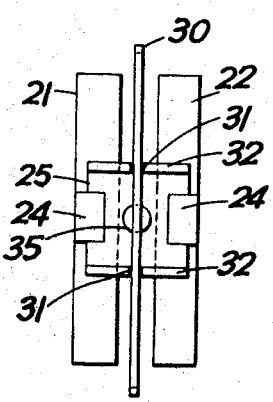
FIGURE 4 is a view showing the relationship of the friction clutch members, the spring ring and the shifter plate.

There are two friction clutch rings 21, 22 which mate with the surfaces 16. Each of the rings has three raised bosses 24 (see FIGURE 4) whch are spaced apart around the periphery of the rings and engage in pairs with a shifter plate 25. There are three shifter plates spaced apart around the rings and each shifter plate is received in a recess 26 in the ring 17.

An annular groove 28 is formed in the teeth 20 of the sleeve 19 and an annular channel 29 is cut in the base of the groove 28. A spring ring 30 is received in the channel 29 and is also received in notches 31, in flanges 32, in the shifter plate 25.

There is a circular hole 35 in each shifter plate and balls 36 are received in the holes 35. Parts of the balls 36 are received in the groove 28 and the base of each recess 26 has a flat V-shaped configuration to constitute two cam surfaces 38 engaging with the balls 36.

The recesses 26 are slightly longer than the shifter plates whereby the shifter plates can move circumferentially relative to the recesses by a limited amount.

Figure 2:
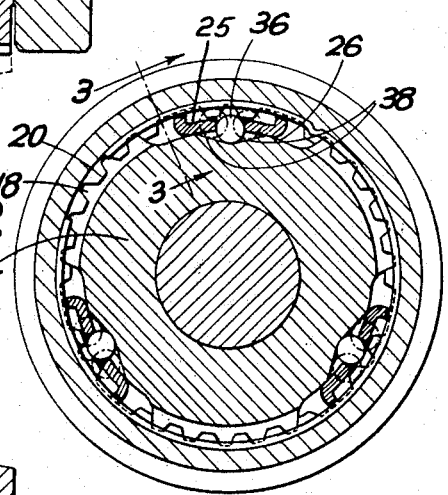
FIGURE 2 is a cross section on the line 2—2 in FIGURE 1.
Figure 3:
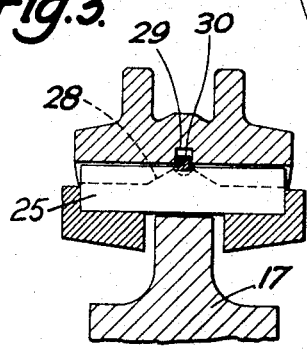
FIGURE 3 is an enlarged scrap cross section on the line 3—3 in FIGURE 2.

In operation of the mechanism and assuming that it is desired to couple gear 10 to the shaft 12 initially rotating at a different speed, the sleeve 19 is pushed, by manual operation of a gear change lever not shown, to the left as seen in FIGURE 1. The movement of the sleeve 19 is transmitted by the spring ring 30 to the shifter plate 25 which in turn moves the friction clutch member 21 into contact with clutch face 16. The resultant frictional drag on member 21 causes limited relative rotation between member 21 and the ring 17, the direction of relative rotation being determined by which of the parts 10 and 12 is rotating the faster. This relative rotation cause the shifter plate 25 to move circumferentially relative to the ring 17 carrying the ball 36 with it. The ball 36 which in normal operation lies in a gap between two teeth 20 in the sleeve 19 (as shown in FIGURE 2) is moved to a position opposite a tooth. Because the ball 36 is in line with a tooth 20, no further movement of the sleeve 19 in the axial direction is possible for the time being.

When synchronism between the gear and shaft has been achieved by engagement of the two parts of the friction clutch (i.e. when the acceleration forces which created the drag between the clutch parts have been reduced to zero), the radial force on the ball 36 tending to move the ball down the ramp 38 and which has been provided throughout by the axial force on the sleeve 19, overcomes the force tending to move the shifter plate to one side of the recess and moves the shifter plate back to the position shown in FIGURE 2. The sleeve 19 is then free to pass over the ball with the ball opposite a gap between two teeth in the sleeve 19. At the same time the spring ring 30 is compressed outwardly and passes with the sleeve 19 over the shifter plates. The sleeve 19 then moves axially to engage its teeth 20 with the teeth 15 on the gear 10.

Clutching the gear 11 to the shaft is effected in a similar manner.

We claim:
1. A synchromesh gear mechanism comprising
   (a) a shaft with an externally splined hub fixed thereon,
   (b) a first dog clutch member free for rotation on said shaft, and having external dog-teeth or splines axially registrable with the splines on the hub,
   (c) a second dog-clutch member in the form of a sleeve with internal dog-teeth or splines engaging with the splines on said hub,
   (d) a friction clutch comprising a first friction clutch surface on said first dog-clutch member and an annular friction member within said sleeve, said annular member being axially movable and having a second friction surface movable by such axial movement into and out of driving engagement with said first friction clutch surface,
   (e) at least one shifter plate received in a recess in the surface of said hub with limited freedom for circumferential movement therein, said shifter plate also having freedom for axial movement in said recess and being in axial thrust-transmitting relation with said annular friction member in the sense to effect clutching engagement of the friction members,
   (f) a stop member located in and radially movable in, a radial hole in said shifter plate and projecting radially inwardly and outwardly from said hole, the inwardly projecting portion of the stop member being engageable with the bottom of the recess in the hub which recess bottom is inclined outwardly in both circumferential directions from a central part of maximum depth and said outwardly projecting portion being aligned with a space between the spline teeth on the sleeve when the inwardly projecting portion is over said central part of the recess and aligned with a spline tooth to baulk axial movement of the sleeve when the stop is moved away from the central part, and
   (g) a limited axial force transmitting connection between said sleeve and said shifter plate whereby when the stop member is over said central part the sleeve is axially movable, with break-down of the connection, to engage the dog-clutch members.

2. A synchromesh gear mechanism as claimed in claim 1 in which the stop member is a ball.

3. A synchromesh gear mechanism as claimed in claim 1 in which the limited force transmitting connection is a spring ring in an internal circumferential groove in the sleeve and releasably engaging in a notch in the shifter plate.

References Cited

UNITED STATES PATENTS

| | | | |
|---|---|---|---|
| 2,221,898 | 11/1940 | Orr | 192—53 |
| 2,399,569 | 4/1946 | Peterson et al. | 192—53 |
| 2,941,641 | 6/1960 | Stump | 192—53 |
| 3,003,607 | 10/1961 | Magg | 192—53 |

DONLEY J. STOCKING, *Primary Examiner.*

T. C. PERRY, *Assistant Examiner.*

U.S. Cl. X.R.

74—339